United States Patent [19]

Heyl

[11] 4,191,095
[45] Mar. 4, 1980

[54] HOLLOW PISTON FOR HYDROSTATIC MACHINES

[75] Inventor: Walter Heyl, Johannesburg, Fed. Rep. of Germany

[73] Assignee: Linde AG, Höllriegelskreuth, Fed. Rep. of Germany

[21] Appl. No.: 854,053

[22] Filed: Nov. 23, 1977

[30] Foreign Application Priority Data

Nov. 26, 1976 [DE] Fed. Rep. of Germany ....... 2653868

[51] Int. Cl.² .................. F15B 21/04; F16K 1/00; F16K 1/08
[52] U.S. Cl. ........................................ 92/78; 91/488; 92/158; 92/172; 92/181 R
[58] Field of Search ............. 91/488; 92/78, 172, 92/181 R, 181 P, 158

[56] References Cited

U.S. PATENT DOCUMENTS

| | | | |
|---|---|---|---|
| 3,106,138 | 10/1963 | Thoma | 91/488 X |
| 3,828,654 | 8/1974 | Wiethoff | 91/488 |
| 3,861,278 | 1/1975 | Forster | 92/78 X |
| 3,896,707 | 7/1975 | Holmstrom | 92/172 |

FOREIGN PATENT DOCUMENTS

| | | | |
|---|---|---|---|
| 1920140 | 9/1970 | Fed. Rep. of Germany | 92/172 |
| 2460393 | 10/1975 | Fed. Rep. of Germany | 92/172 |

*Primary Examiner*—Irwin C. Cohen
*Attorney, Agent, or Firm*—Karl F. Ross

[57] ABSTRACT

A hollow piston for a hydrostatic piston machine and especially for a swash-plate-type axial-piston pump or motor, comprises a hollow outer cylinder member which is formed at one end with a ball head and at the other end with a cover. Extending centrally through this hollow piston is a central post having its opposite ends secured to or engaging the opposite ends of the outer piston member and formed with a central bore communicating between a passage in the cover and a passage in the ball head. At least one of these ends of the central post is juxtaposed with a respective end of the piston and the juxtaposed ends are formed with a conical surface and an edge engaging this surface to seal the post to the outer member.

6 Claims, 5 Drawing Figures

HOLLOW PISTON FOR HYDROSTATIC MACHINES

FIELD OF THE INVENTION

The present invention relates to a hollow piston and, more particularly, to a hollow piston for an axial-piston machine, such as an axial-piston pump or an axial-piston motor.

BACKGROUND OF THE INVENTION

An axial-piston machine such as an axial-piston pump or motor generally comprises a rotatable cylinder drum formed with a plurality of angularly equispaced cylinder bores each of which receives a piston which is reciprocated parallel (substantially) to the axis of rotation of the cylinder drum as the latter is rotated.

The pistons are usually formed with an end which extends from the cylinder drum and engages an inclined or inclinable reaction surface along which this end of the piston can ride or with which this end of the piston is coupled.

In modern axial-piston machines of this type, the piston is formed at this end with a ball head which is engaged with a shoe riding along the reaction surface or received in a socket of the reaction surface, depending upon the type of axial-piston machine which is involved.

The axially reciprocatable pistons are provided with central bores which terminate at these ball heads to provide a fluid cushion between the end of the piston and the reaction surface or the shoe by means of which it is retained against bears upon the reaction surface. The bore terminates at the opposite end of the piston which is juxtaposed with the end of the cylinder provided with a port adapted to communicate with the valve or control surfaces of the machine upon which the cylinder rides. This surface may be formed by a plate or by an end wall of a housing in which the cylinder is journaled.

Thus fluid pressure is transmitted from the working compartment of the cylinder to the head of the piston so that the fluid transfer by the piston passage constitutes a lubricating and friction-relieving medium at the piston head.

It is known, in such machines, to provide a hollow piston which cooperates with the swash plate of the axial-piston machine and which is formed with a central post intended to reduce the mass of the piston. This central post is formed with the passage and only partially fills the interior of the piston. As a result, the piston is constituted by an outer piston member whose external wall is cylindrical and which is of relatively thin-wall construction to reduce the piston mass. Since it is disadvantageous to completely fill the piston with the fluid medium, for reasons which will be dealt with below, the post extending through the piston centrally forms a passage of limited volume and, at the same time, supports the opposite ends of the piston against one another and may provide support for the cylindrical wall portion of the outer piston member as well.

Such hollow pistons are used so as to reduce the combined weight of the rotating cylinder drum and the plurality of pistons reciprocating therein.

In order to maintain this rotating mass as low as possible, it is desirable to make the pistons completely hollow. However, if the pistons are also to serve to transmit fluid from the working end of the piston to the reaction end or spherical head thereof, a relatively large fluid volume can be formed in the interior of the piston. If the piston wall is thin, this fluid is pressurized during the rotation of the drum and tends to press the wall of the piston outwardly and distort the latter. This can cause the piston to seize in its cylinder bore. Furthermore, because the wall of the piston is alternately compressed and expanded, energy is consumed which reduces the efficiency of the axial piston machine.

To avoid this expansion and compression and, more generally, any distortion of the hollow piston, it has been proposed to provide a post within the piston and to form this post with a small diameter passage communicating between the working end and the reaction end of the axial piston.

Such a piston is described in German open application (Offenlegungsschrift) No. 2,364,725.

The piston described in this publication has an end cover which is provided at the working end of the piston, i.e. the end opposite the reaction end or spherical head, which is bonded to the remainder of the outer piston body in a plane lying perpendicular to the piston axis by pressure-friction welding. Pressure-friction welding is effected by pressing the cover element against the body at the faces between them and displacing the body or the cap relative to the other at such a velocity that the friction force generates sufficient heat to cause fusion of the two parts.

Since the cover also engaged the post, the contact surface between the centrally disposed post and the cover was at a smaller diameter than the contact surface between the outer body and the cover. As a result, the relative speed of the post and the cover was frequently too small to obtain a satisfactory press-friction welding of the post to the cover. As a consequence, a satisfactory seal between the two could not always be obtained and some leakage of liquid into the space surrounding the post frequently occurred. This unnecessarily increased the mass of the piston and, in addition, caused the distortion and compression/contraction phenomena discussed previously since the cover was provided with a bore which registered with the bore of the post.

OBJECT OF THE INVENTION

It is the principal object of the present invention to provide an improved hollow piston of the aforedescribed general type whereby the disadvantages discussed above are obviated and an effective seal can be provided between the post and the remainder of the piston body.

SUMMARY OF THE INVENTION

These objects are attained, in accordance with the present invention, by providing the end of the central column, or each end thereof to be engaged with an opposite part of the hollow piston, e.g. to cover member or the head end of the piston, with a conical surface which can be engaged by a sharp edge of the other part.

According to the invention, the junction between the cover and the juxtaposed end of the post is located out of the plane of contact between the outer piston body and the cover formed at the working end of the piston.

According to yet another feature of the invention, the cover is formed with a gap filter or a fluid-flow throttle for the hydraulic pressure medium.

According to the principles of the present invention, the outer piston body is formed at one end with a ball head and at the other end with a cover, the body being provided between these ends with a cylindrical hollow shell which is connected to the head by a transverse web forming a single piece with both the head and the outer shell.

The cover is formed as another piece and is friction welded to both the cylindrical shell and the central post.

The central post, according to a feature of the invention, is formed with a wall-supporting shoulder in one piece, this shoulder bearing along the inner surface of the cylindrical shell proximal to the end thereof to which the cover is to be frictionally welded. The central column is connected with the transverse web by friction welding and, thereafter, the cover is friction welded at the aforementioned conical surface to the central post and at surfaces perpendicular to the axis of the piston to the cylindrical shell.

According to a feature of the invention, the end face of the cylindrical shell and the conical surface of the central post are formed in a turning operation by a combination tool simultaneously and after the post has been friction welded within the body of the piston.

According to another aspect of the invention, the sealed end of the piston is ground into round.

The hollow piston can be formed, at this sealed end, with a gap filter and, according to the invention, the gap filter may be provided on the cover by press-friction welding of another piece thereto.

The piston according to the present invention does not necessarily require that the endface of the cylindrical shell which is bonded to a planar peripheral face of the cover be coplanar with the connection between the cover and the central column.

The configuration of the piston of the present invention has considerable advantages over the earlier system described previously, especially when the piston has the additional function of providing a gap filter or throttle, especially a flow throttle, which can reduce the tendency of the fluid cushion interface from the reaction surface against which the piston is held upon a rapid discharge of liquid through the cushion compartment. It should be understood that a rapid flow of fluid through this cushion compartment tends to lift the juxtaposed faces of the shoe away from the reaction surface of the swash plate in an undesirable manner. This phenomenon is avoided when the cover is formed with a flow throttle for the fluid transmitted to the head of the piston.

Naturally, when the piston is provided with a narrow-gap throttle, it can also form a filter which prevents the passage of large dirt particles. The gap may be narrower than the constricted throttle location but has a total flow cross section, by being formed circumferentially in the cover of the piston, that it itself does not impede flow but serves as the aforementioned gap filter.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
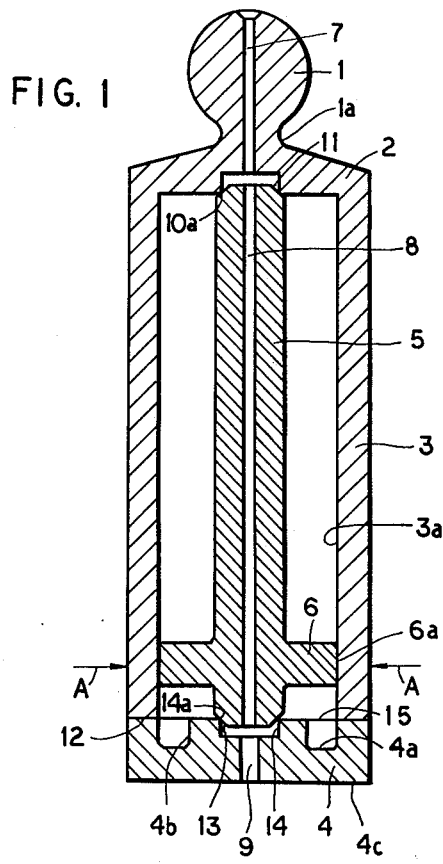
FIG. 1 is an axial cross-section view through a hollow piston in its simplest embodiment according to the present invention.

The piston shown in FIG. 1 comprises a ball head 1, engageable with a shoe forming a pressure cushion against a swash plate of an axial-piston machine (not shown) of conventional design. The head 1 is connected by a neck 1a with a transverse web 2 provided peripherally with a cylindrical outer body 3 forming the main wall of the piston. At its working end, i.e. the end defining the pressurizable compartment within the respective cylinder bore of a rotating cylinder drum, the body 3 is friction welded to a cover 4 whose endface 4c is turned toward the apertured plate against which the cylinder drum rides.

Within the piston, there is provided a central post 5 which is formed in one piece with a supporting disk or shoulder 6 whose periphery 6a engages the inner wall 3a of the cylindrical body 3.

The ball head 1 is provided with an axial bore 7. The central post 5 is formed with an axial bore 8 which registers with the bore 7 and communicates with a central bore 9 in the cover 4. The bores 7, 8 and 9 are thus connected together.

The transverse web 2, which is formed unitarily (in one piece) with the head 1 and the cylindrical body 3, is formed with an inwardly open recess 10 having a sharp edge 10a which is engageable with a conical surface or bevel 11 formed at the end of the post 5 turned toward the head 7. The edge and bevel engagement results in a firm friction weld between the post 5 and the web 2.

According to the invention, before the cover 4 is applied, the post 5 is press-friction welded to the transverse web 2 and thus is bonded to the latter.

Thereafter, the body 3 is engaged by a chuck applying pressure in the direction of arrows A, in the plane of the support shoulder or disk 6 so that the relatively thin wall of the body 3 is deformed against this support disk 6 and holds the same firmly. This retains the post 5 and the body 3 in fixed positions relative to one another for the subsequent friction welding process.

The planar surface 12 at the working end of the body 3 and the bevel 13 at the corresponding end of the post 5 can then be formed simultaneously by turning, e.g. in a lathe, whose chuck has engaged the body 3 in the manner described.

The planar surface 12 is perpendicular to the axis of the piston and the post 5 may project beyond the plane of this surface.

The corresponding endface of the cover 4 is then pressed against the endface 12 while and edge 14a of an axial recess 14 in this cover 4 bites into the bevel 13. The bore 9 opens into the recess 14.

The cover 4 is applied and held against the body 3 and the post 5 while the latter is rotated at high speed to carry out the friction-pressure welding with perfect sealing of the members.

The piston is then released from the chuck and expands somewhat. Hence, subsequent to the final friction-pressure welding step, the outer surface of the piston is ground to remove any lack of concentricity.

Figure 2:
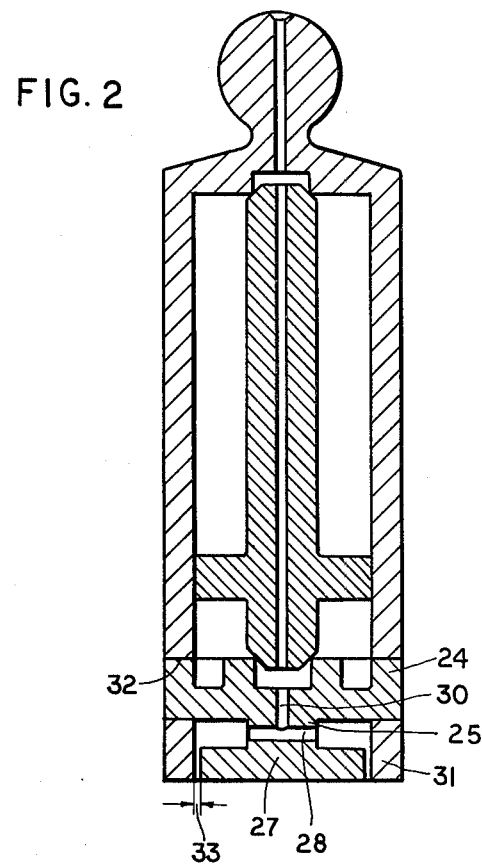
FIG. 2 is an axial cross-sectional view through a piston provided with an axial-gap filter according to a feature of the invention.
Figure 4:
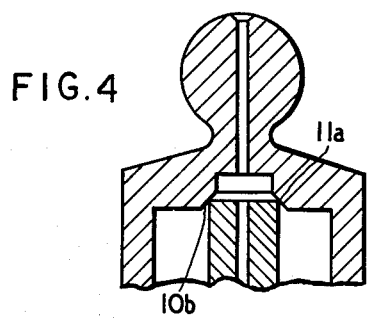
FIG. 4 is an axial cross-sectional view of the reaction or head end of a piston illustrating still another embodiment.

The piston of FIG. 2 differs from that of FIG. 1 only in the form of the cover 24. In this case, the cover 24 is provided with a boss 25 carrying a terminal flange 27. The boss 25 is provided with a transverse bore 28 which communicates with a longitudinal bore 30. Around the plate or flange 27 and against the flank 32 of the cover 24, a ring 31 is friction-pressure welded. Between the cylindrical surface of flange 27 and the cylindrical inner surface of ring 31, an annular gap 33 is provided, the annular gap having a width 33 which is smaller than the smallest diameter of the throttle formed by the bores 7, 8, 30, 28. This gap thus forms a gap filter which prevents passage of contaminants through the piston. The total flow cross section of the gap 33 can, however, be greater than the flow cross sections of bores 28, 30, 8 and 7. Best results are obtained when the gap width is between 0.2 and 0.3 mm.

Figure 3:
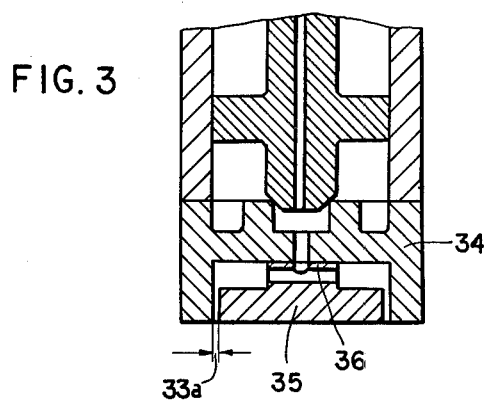
FIG. 3 is an axial cross-sectional view of the working end of a hollow piston having another form of axial-gap filter in accordance with the principles of the present invention.
Figure 5:
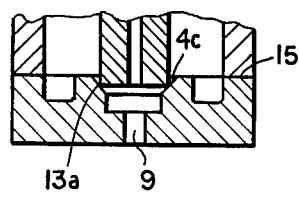
FIG. 5 is a fragmentary cross-sectional view of the working end of the piston according to the present invention illustrating a modification.

The embodiment of FIG. 3 differs from that of FIG. 2 only in that the ring 31 of FIG. 2 is replaced by an apron which surrounds a member 35 which is press-friction welded to the planar surface 36 of the cover 34. Member 35 defines the annular gap 33a with the apron and is provided with bores analogous to the bores 28 and 30 previously described.

I claim:

1. A hollow piston for an axial-piston machine comprising:

a hollow cylindrical body having a working end, a reaction end, and formed with an internal space closed at said reaction end and open at said working end;

a post extending centrally within the interior of said body and having an end part terminating at said working end, said post being formed with a central passage, said reaction end having a bore communicating with said passage in said post; and a cover secured to said body at said working end, said cover having a part juxtaposed with said end part of said post, one of said parts being provided with a conical surface and the other of said parts having an edge engaging said conical surface, said cover having a further passage communicating with said central passage.

2. The piston defined in claim 1 wherein the connection between said cover and said post lies out of the plane of engagement between said cover and said body.

3. The piston defined in claim 1 wherein said cover is formed with a gap filter communicating with said further passage.

4. The piston defined in claim 1 wherein said cover is formed with a flow throttle for hydraulic medium supplied through said cover to said passage in said post.

5. The piston defined in claim 1 wherein said body is formed at said reaction end with a ball head traversed by an axial bore forming part of said reaction end bore and communicating with said central passage, said post is formed with a transversely extending disk engageable with an inner wall of said body proximal to said working end of said body, said conical surface is provided on said post and said edge is formed on said cover, said cover having an axial bore defining said further passage and communicating with said central passage, said bore opening at an endface of said cover.

6. The piston defined in claim 5 wherein the bore opening at said endface communicates with an axially extending annular gap having a gap width of 0.2 mm to 0.3 mm.

* * * * *